United States Patent
Legay et al.

(10) Patent No.: US 12,381,320 B2
(45) Date of Patent: Aug. 5, 2025

(54) ACTIVE-ARRAY MULTI-BEAM ANTENNA COMPRISING A HYBRID DEVICE FOR FORMING DIRECTIVE BEAMS

(71) Applicant: THALES, Courbevoie (FR)

(72) Inventors: Hervé Legay, Plaisance du Touch (FR); Etienne Girard, Plaisance du Touch (FR); Jean-Philippe Fraysse, Toulouse (FR); Florian Vidal, Toulouse (FR)

(73) Assignee: THALES, Courbevoie (FR)

( * ) Notice: Subject to any disclaimer, the term of this patent is extended or adjusted under 35 U.S.C. 154(b) by 348 days.

(21) Appl. No.: 17/990,248

(22) Filed: Nov. 18, 2022

(65) Prior Publication Data

US 2023/0163460 A1 May 25, 2023

(30) Foreign Application Priority Data

Nov. 19, 2021 (FR) ...................................... 2112247

(51) Int. Cl.
*H01Q 1/28* (2006.01)
*H01Q 3/28* (2006.01)
*H01Q 3/36* (2006.01)
*H01Q 19/06* (2006.01)

(52) U.S. Cl.
CPC ............... *H01Q 3/36* (2013.01); *H01Q 1/288* (2013.01); *H01Q 3/28* (2013.01); *H01Q 19/06* (2013.01)

(58) Field of Classification Search
CPC ............ H01Q 3/36; H01Q 3/28; H01Q 1/288; H01Q 19/06; H04B 7/0617
See application file for complete search history.

(56) References Cited

U.S. PATENT DOCUMENTS

| | | | | |
|---|---|---|---|---|
| 5,959,578 A | * | 9/1999 | Kreutel, Jr. ............ | H01Q 25/00 342/368 |
| 8,344,945 B2 | | 1/2013 | Craig et al. | |
| 2005/0101352 A1 | * | 5/2005 | Logothetis ........... | H01Q 3/2605 455/562.1 |
| 2007/0001897 A1 | * | 1/2007 | Alland .................... | G01S 7/352 342/158 |
| 2008/0297414 A1 | * | 12/2008 | Krishnaswamy ....... | H03L 7/087 342/368 |
| 2013/0113657 A1 | * | 5/2013 | Behbahani ............. | H01Q 25/00 342/373 |
| 2013/0163705 A1 | * | 6/2013 | Stirland ................. | H04B 7/086 375/346 |
| 2020/0411971 A1 | * | 12/2020 | Fraysse ................. | H01Q 1/288 |
| 2022/0166129 A1 | * | 5/2022 | Tang ...................... | H01Q 1/246 |

* cited by examiner

*Primary Examiner* — Awat M Salih
(74) *Attorney, Agent, or Firm* — BakerHostetler

(57) ABSTRACT

An active-array multi-beam antenna includes radiating elements and a hybrid device for forming directive beams. The hybrid device comprises an analogue stage divided into a plurality of analogue beam-forming networks forming like regional beams, and a digital stage suitable for forming the directive beams from the regional beams. A first sub-array is associated with first radiating elements. A second sub-array is associated with second radiating elements. The second sub-array has the same dimensions as the first sub-array. The second sub-array partially overlaps the first sub-array.

11 Claims, 13 Drawing Sheets

ACTIVE-ARRAY MULTI-BEAM ANTENNA COMPRISING A HYBRID DEVICE FOR FORMING DIRECTIVE BEAMS

CROSS-REFERENCE TO RELATED APPLICATION

This application claims priority to foreign French patent application No. FR 2112247, filed on Nov. 19, 2021, the disclosure of which is incorporated by reference in its entirety.

FIELD OF THE INVENTION

The present invention relates to the active-array multi-beam antennas especially used in the field of satellite telecommunications systems, or of radar systems or of fixed or mobile, earth, sea or airborne communication systems.

BACKGROUND

It is known in the prior art to use passive multi-beam antennas. These usually consist of reflector antennas associated with multi-source focal-plane arrays. With such multi-beam antennas operating in transmit mode, the power of the amplifier associated with each radiating element is preferentially radiated in a given direction. It is thus necessary to manage the spatial allocation of power, depending on the spatial distribution of traffic. This allocation constraint greatly limits the flexibility of the payload, i.e. the ability to adapt to variations in traffic. Multi-beam coverage allows the same frequency resource to be reused in various regions of the coverage of the antenna, and therefore allows throughput to be increased by the number of times that a given frequency resource is reused. Spatial allocation of capacity is then achieved by assigning each beam a radiated power budget and frequency resources. The overall power radiated by a passive antenna is thus distributed between the various beams. The increasingly pronounced tendency in very-high-throughput satellites is to decrease the size of the beams and to increase the number thereof in order to benefit from a high degree of frequency-band reuse. As the size of the beams decreases, the capacity allocated per beam is distributed over an increasingly small area of ground, and it becomes difficult to dynamically modify the capacity per beam using an architecture in which only some of the radiating elements of the antenna contribute to each beam. It is therefore difficult to allocate resources with a passive multi-beam antenna.

To overcome this problem, it is known to use active-array multi-beam antennas. This type of antenna comprises radiating elements, active components such as amplifiers and a beam-forming network (BFN). These various components allow the properties of the transmitted beams to be modified in the spatial domain. The amplifier power associated with each radiating element is then assigned to the entirety of the geographic zone covered by the antenna. It is thus no longer necessary to manage the assignment of this radiated power spatially. This type of antenna is suitable for instalment in flexible high-throughput satellite telecommunications payloads. An active-array multi-beam antenna is an antenna suitable for generating, as output, beams directed towards particular geographic zones of the terrestrial sphere based on communication signals received beforehand as input. The active-array antenna comprises, to do this, beam ports and radiating-element ports able to operate when the antenna is in transmit mode and when the antenna is in receive mode. Spatial allocation of capacity is then achieved by assigning each beam a radiated power budget and frequency resources.

On the contrary, an active-array multi-beam antenna is characterized by the fact that all the radiating elements contribute to all the beams. The power of the amplifier associated with each radiating element is then assigned to the entirety of the geographic zone covered by the antenna. It is thus no longer necessary to manage the assignment of this radiated power spatially.

Synthesizing these multi-beam coverages with active-array antennas is however a major objective. Specifically, neither analogue beam forming nor digital beam forming allows the challenges of a large antenna comprising a very high number of radiating elements to be met.

With an active-array multi-beam antenna, all the radiating elements contribute to forming all the beams. In the case of digital beam forming, all the radiating elements must be digitized in the total bandwidth assigned to the antenna.

Analogue beam forming allows the number of feeds to be digitized to be decreased, because the number of beam feeds is usually lower than the number of radiating elements, and the signals delivered to these feeds may have a narrow bandwidth. Use of analogue beam forming is however limited by practical considerations.

It is known in the prior art to employ hybrid beam forming, including an analogue stage and a digital stage. The analogue stage is applied to sub-arrays formed by grouping a plurality of contiguous radiating elements together and produces a plurality of regional beams. The width of these regional beams depends on the number of radiating elements associated with the sub-arrays. The numbers of radiating elements and of regional beams are chosen to be lower than technology-related limiting thresholds of the analogue beam-forming network. The digital stage is applied to signals output from regional-beam feeds, said signals being produced by the analogue stage for the various sub-arrays, this allowing directive beams to be formed inside the regional beams. This hybrid beam forming therefore allows the limitation of the analogue stage to be overcome, while minimizing the consumption of the digital stage. Specifically, this consumption is mainly produced by the signal-digitization interfaces. It increases as the frequency bands to be digitized increase.

However, hybrid beam forming is characterized by the appearance of grating lobes when the directive beam produced by the digital stage approaches an edge of the regional beam. This results in a loss of gain and a risk of interference with signals aligned with the grating lobe, if these signals are allocated the same resource. These drawbacks lead the angular sector inside the regional lobe in which directive beams can be produced to be limited. They therefore limit the number of directive beams that it is possible to produce digitally and contribute to limiting throughput.

Document U.S. Pat. No. 83,444,945 discloses an active-array multi-beam antenna comprising a hybrid directive-beam-forming network comprising an analogue stage and a digital stage. The analogue stage is divided into a plurality of sub-arrays, each sub-array being associated with a plurality of radiating elements to form regional beams. In this document, sub-arrays overlap, i.e. radiating elements are common to a plurality of sub-arrays. This overlap is arranged so that the radiating elements may contribute to a high number of sub-arrays, this making implementation of the analogue stage extremely complex.

There is therefore a need to find a solution having a limited complexity and allowing a high number of directive beams to be generated while limiting gain losses and interference.

SUMMARY OF THE INVENTION

The aforementioned objective is achieved via an active-array multi-beam antenna suitable for receiving communication signals. This active-array multi-beam antenna comprises radiating elements, each radiating element being able to deliver output signals based on communication signals, said radiating elements being arranged in a matrix array of radiating elements, said matrix array extending in a first direction and in a second direction perpendicular to the first direction. The multi-beam antenna also comprises a hybrid device for forming directive beams. This hybrid device comprises an analogue stage divided into a plurality of analogue beam-forming networks. Each analogue beam-forming network is associated with a sub-array containing a plurality of radiating elements of the matrix array, with a view to forming regional beams from the output signals delivered by said radiating elements. The sub-arrays form like regional beams. The hybrid device also comprises a digital stage suitable for forming the directive beams from the regional beams, said formed directive beams being contained inside the regional beams. A first sub-array is associated with first radiating elements of the matrix array M, said first sub-array having a rectangular shape having a first dimension in the first direction of the matrix array and a second dimension in the second direction of the matrix array. A second sub-array is associated with second radiating elements of the matrix array. The second sub-array has the same dimensions as the first group/sub-array. The second sub-array partially overlaps the first sub-array so that some radiating elements are common to said first sub-array and to said second sub-array. In the multi-beam antenna, the second sub-array is offset with respect to the first sub-array in the first direction of the matrix array by a first offset corresponding to half the first dimension of the rectangular shape of the sub-array and the second sub-array is offset with respect to the first sub-array in the second direction of the matrix array by a second offset corresponding to half the second dimension of the rectangular shape. The first sub-array belongs to a first group of sub-arrays and the second sub-array belongs to a second group of sub-arrays.

The proposed solution consists in dividing the radiating elements into at least a first group of radiating elements and a second group of radiating elements. The second group of radiating elements is offset by one half-period along the two axes with respect to the first group of radiating elements. The same radiating elements thus participate in two sub-arrays. Analogue beam forming is then applied to these sub-arrays. It is carried out by applying a phase and amplitude weighting to the RF signals, the weighting depending on the position of the radiating elements in the sub-array and on the targeted direction. The analogue beam forming forms one or more orientable regional beams in the chosen angular sector. Each sub-array forms like regional beams. Complementary digital beam forming is carried out in the digital processor, by applying phase and amplitude weighting. This weighting is applicable to each sub-array (one amplitude and phase coefficient per sub-array). This weighting depends on the position of the radiating elements at the centre of the sub-array and on the direction targeted inside the regional beam. The invention thus allows a plurality of objectives to be met. Dividing the beam-forming network into an analogue stage and a digital stage allows the technological constraints of implementation of the analogue stage to be met, it also makes it possible for the digital stage not to exceed a parametrizable power-consumption threshold, while avoiding the appearance of grating lobes generated by this partition. Furthermore, by maximizing the number of beams and the degree of reuse of frequency or time resources, it is possible to maximize the throughput in zones of heavy traffic, while avoiding wasting consumed power in zones of light traffic. Lastly, the interleaved formation of beams when the groups of radiating elements are offset by one half-period allows the number of directive beams to be increased by a factor of four, whereas the complexity of the digitization interfaces is increased only by a factor lower than 2.

In one particular embodiment, the first dimension and the second dimension of the first sub-array are identical so that the first sub-array and the second sub-array have a square shape.

In one particular embodiment, the directive beams have various widths.

In one particular embodiment, the analogue stage forms at least two regional beams with different widths.

In one particular embodiment, the communication signals are subjected to a uniform window function or to a tapered window function.

In one particular embodiment, the analogue stage comprises a quasi-optical beam-forming network.

In one particular embodiment, the quasi-optical beam-forming network comprises Rotman lenses or continuous-delay lenses.

In one particular embodiment, the active-array multi-beam antenna is reconfigurable.

In one particular embodiment, the analogue stage comprises a time-division multiple-access module suitable for forming at least one reconfigured regional beam, said reconfigured regional beam moving at the rate of a time frame.

In one particular embodiment, the analogue stage comprises a frequency-division multiple-access module suitable for forming a plurality of contiguous regional beams associated with sub-bands of variable width.

Another subject of the invention relates to a multi-beam antenna according to the invention.

BRIEF DESCRIPTION OF THE DRAWINGS

The invention will be better understood and other advantages will become apparent on reading the following non-limiting description with reference to the appended figures, in which.

DETAILED DESCRIPTION

Figure 1:
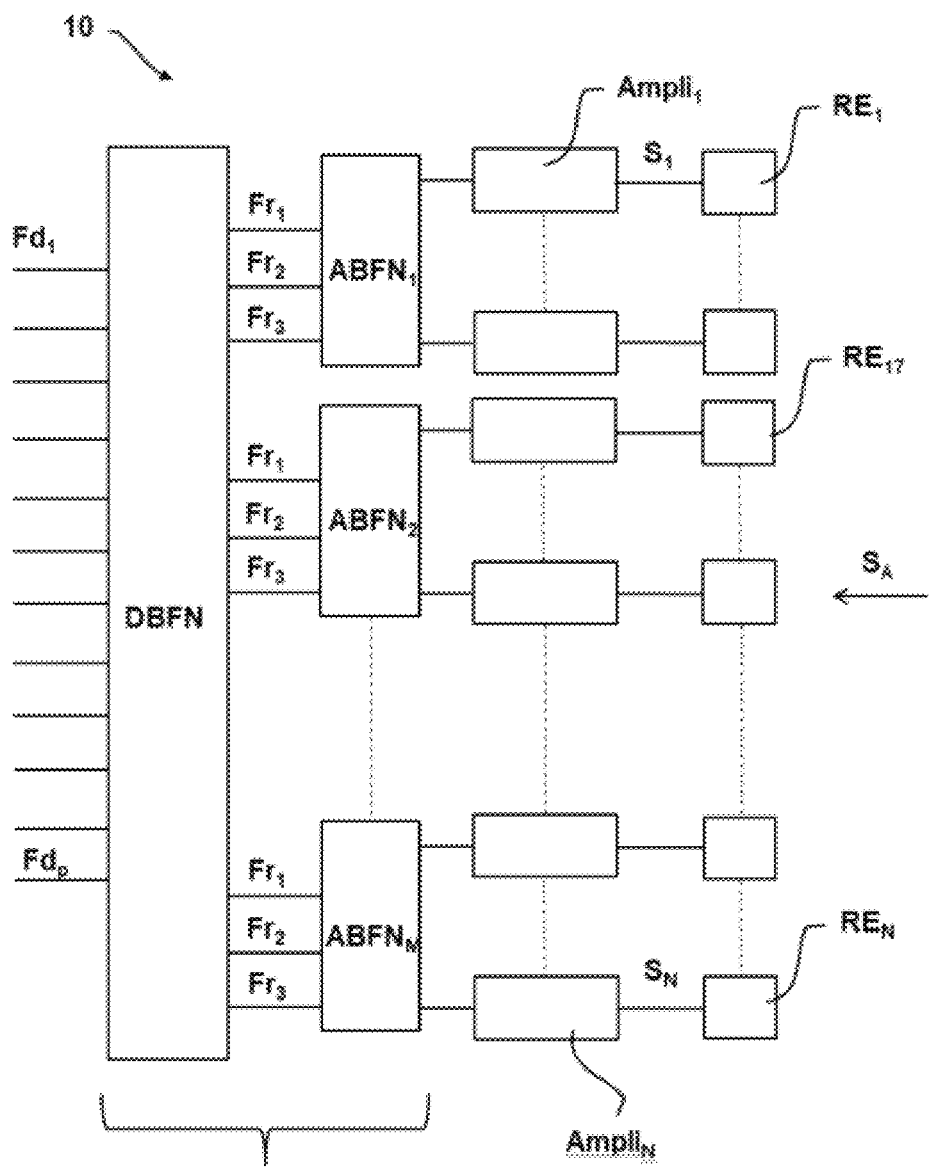
FIG. 1 is a schematic representation of an active-array multi-beam antenna according to the invention.

FIG. 1 is a schematic representation of an active-array multi-beam antenna 10 according to the invention.

This active-array multi-beam antenna 10 comprises:
a plurality of radiating elements $RE_1$-$RE_N$;
a plurality of amplifiers $Ampli_1$-$Ampli_N$;
a hybrid device 20.

Each radiating element $RE_1$-$RE_N$ is suitable for receiving and processing communication signals $S_A$ and for delivering resultant output signals $S_1$-$S_N$. These communication signals $S_A$ are, for example, subjected to a uniform window function. As a variant, the communication signals $S_A$ are subjected to a tapered window function. By "tapered window function", what is meant is a top-hat window function that has a high state and a low state and that passes to the high state gradually.

Each amplifier $Ampli_1$-$Ampli_N$ is suitable for receiving one output signal $S_1$-$S_N$ from the radiating elements $RE_1$-$RE_N$ and for amplifying it.

Figure 8:
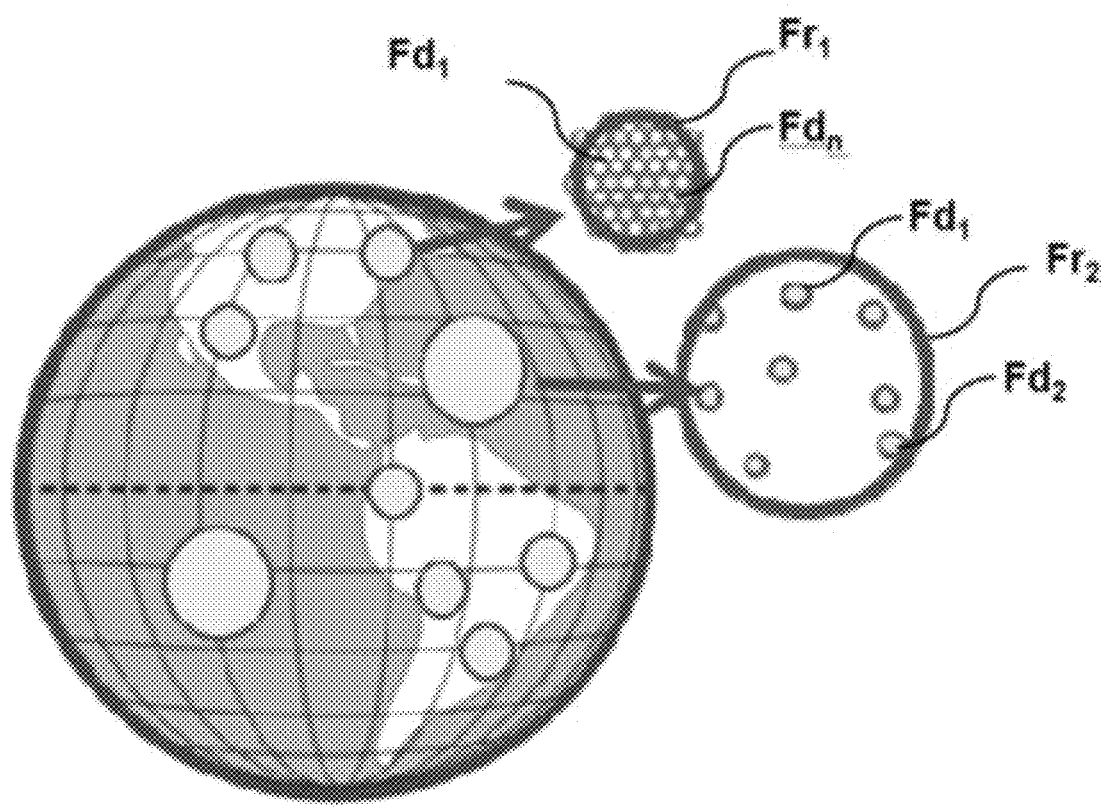
FIG. 8 is a schematic representation of at least one regional beam and a plurality of directive beams according to the invention.

The hybrid device 20 is suitable for forming directive beams $Fd_1$-$Fd_M$. This hybrid device 20 comprises an analogue stage ABFN (ABFN standing for analogue beam-forming network) and a digital stage DBFN (DBFN standing for digital beam-forming network). The analogue stage ABFN is suitable for forming regional beams $Fr_1$, $Fr_2$, $Fr_3$. The digital stage DBFN is suitable for forming directive beams $Fd_1$-$Fd_P$ from the regional beams $Fr_1$, $Fr_2$, $Fr_3$. The formed directive beams $Fd_1$-$Fd_P$ are contained inside the regional beams $Fr_1$, $Fr_2$, $Fr_3$. Such directive and regional beams are more specifically illustrated in FIG. 8. In FIG. 8, the active-array multi-beam antenna 10 is suitable for targeting various zones of the globe with regional beams $Fr_1$, $Fr_2$. Each regional beam contains a plurality of directive beams. The number of directive beams in each regional beam may be different. Thus, a first regional beam $Fr_1$ contains a high number of directive beams. A second regional beam $Fr_2$ contains a limited number of directive beams. The regional beams $Fr_1$, $Fr_2$ here have different widths. In the same way, the directive beams may have various widths.

Figure 2:
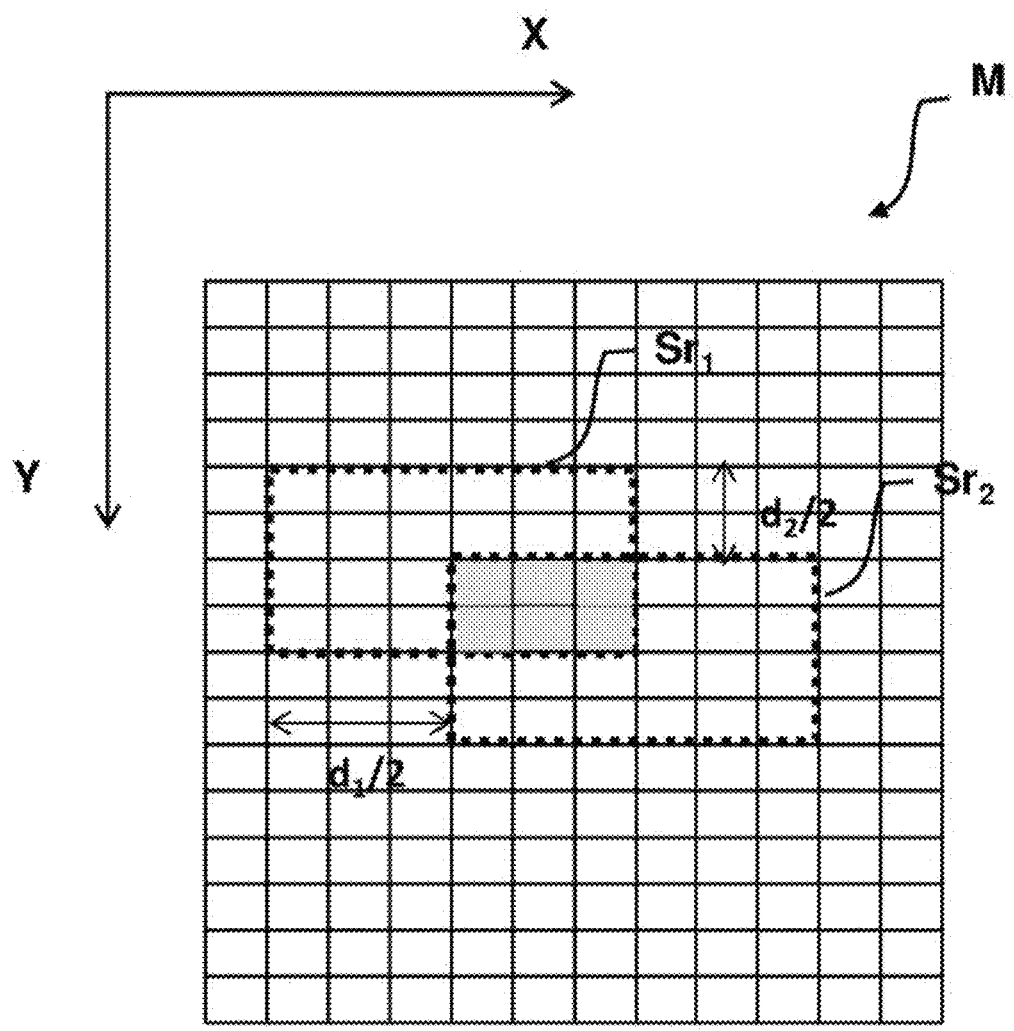
FIG. 2 is a schematic representation of a matrix array of radiating elements of the multi-beam antenna of FIG. 1, in which sub-arrays associated with radiating elements are organized according to a first embodiment.
Figure 3:
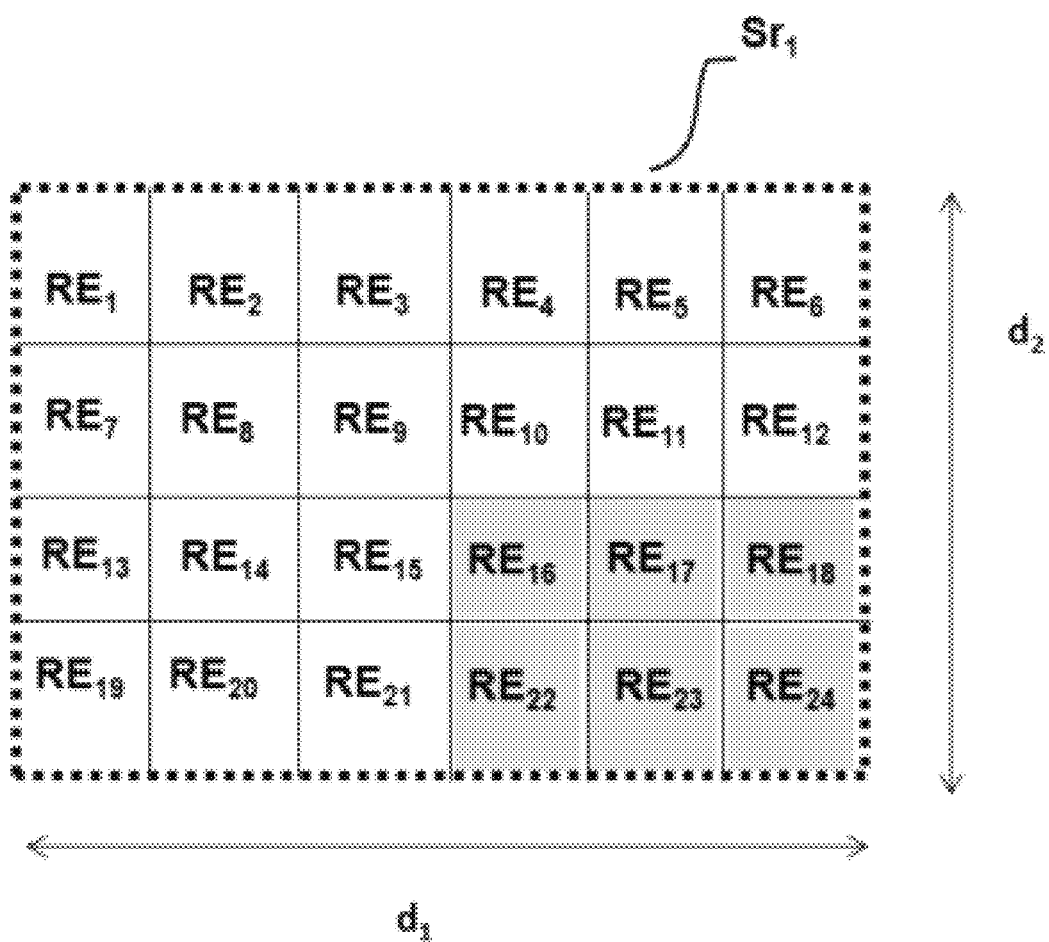
FIG. 3 is a schematic representation of the radiating elements belonging to a first sub-array of the sub-arrays of FIG. 2.
Figure 4:
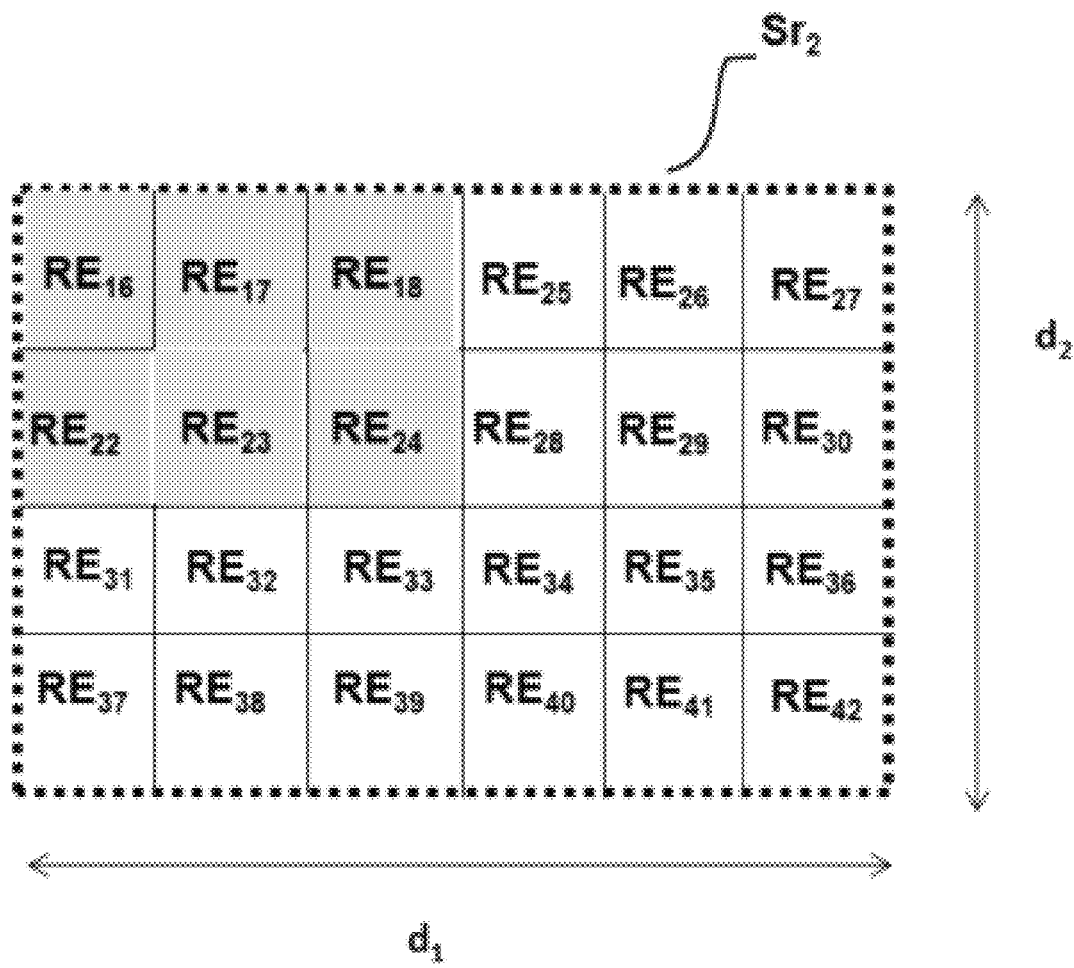
FIG. 4 is a schematic representation of the radiating elements belonging to a second sub-array of the sub-arrays of FIG. 2.

The analogue stage ABFN is divided into a plurality of analogue beam-forming networks $ABFN_1$-$ABFN_M$. Each analogue beam-forming network $ABFN_1$-$ABFN_M$ is associated with one sub-array containing a plurality of radiating elements. Such sub-arrays are especially disclosed in FIGS. 2, 3 and 4. In FIG. 2, the radiating elements, which have been shown in the form of squares, form a matrix array M. This matrix array extends in a first direction X and in a second direction Y perpendicular to the first direction X. More precisely, a first set of radiating elements forms a first sub-array $Sr_1$ of radiating elements, and a second set of radiating elements forms a second sub-array $Sr_2$ of radiating elements. The first sub-array $Sr_1$ is more particularly illustrated in FIG. 3 and it comprises in this FIG. 24 radiating elements $RE_1$-$RE_{24}$. This first sub-array $Sr_1$ is on the whole rectangular in shape and has a dimension $d_1$ in the first direction X and a dimension $d_2$ in the second direction Y. This first sub-array $Sr_1$ belongs to a first group $Gr_1$ of sub-arrays. The second sub-array $Sr_2$ is illustrated in FIG. 4. It also comprises 24 radiating elements $RE_{16}$-$RE_{18}$, $RE_{22}$-$RE_{24}$, $RE_{25}$-$RE_{42}$. This second sub-array $Sr_2$ is rectangular in shape and has a dimension $d_1$ in the first direction X and a dimension $d_2$ in the second direction Y. This second sub-array $Sr_2$ belongs to a second group $Gr_2$ of sub-arrays. As illustrated in FIG. 2, the second sub-array $Sr_2$ partially overlaps the first sub-array $Sr_1$ so that the radiating elements $RE_{16}$, $RE_{17}$, $RE_{18}$, $RE_{22}$, $RE_{23}$, $RE_{24}$ are common to the first sub-array $Sr_1$ and to the second sub-array $Sr_2$. These common radiating elements have more particularly been coloured grey in FIGS. 2-3. Furthermore, the second sub-array $Sr_2$ of radiating elements is offset with respect to the first sub-array $Sr_1$ in the first direction X of the matrix array M by a first offset corresponding to half the first dimension $d_1$ of the rectangular shape and in the second direction Y by a second offset corresponding to half the second dimension $d_2$ of this rectangular shape.

Figure 5:
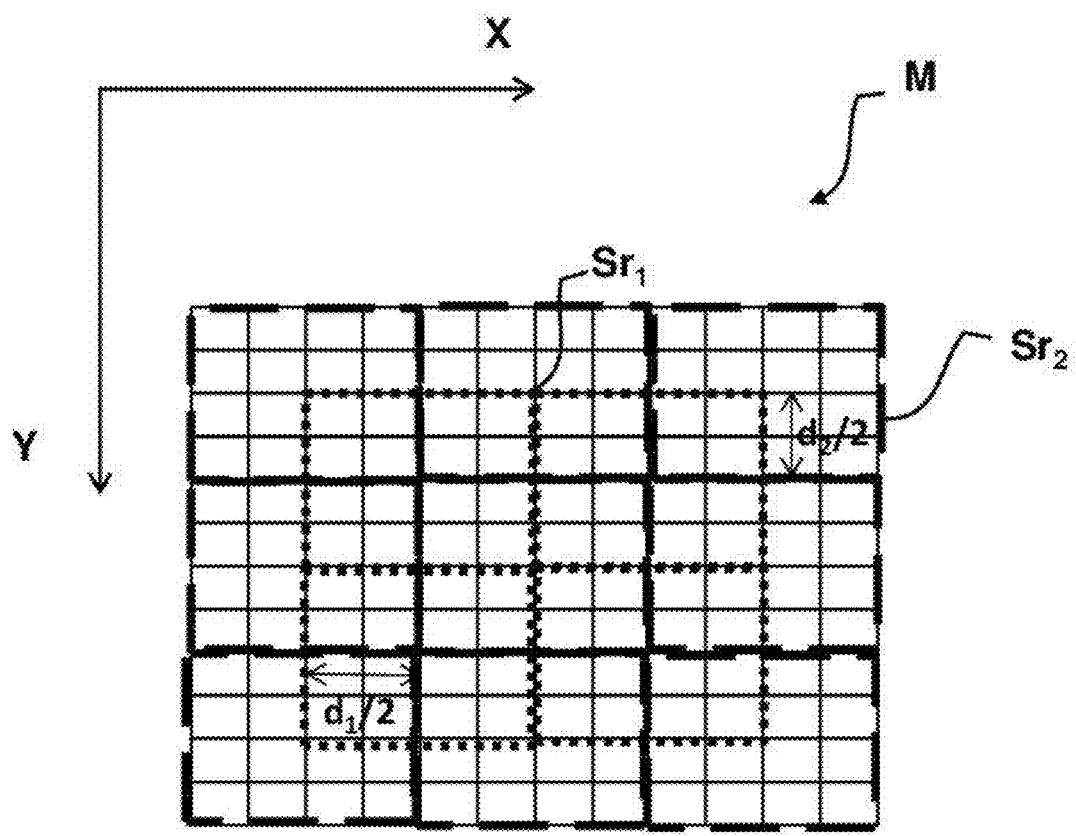
FIG. 5 is a schematic representation of a matrix array of radiating elements of the multi-beam antenna of FIG. 1, in which sub-arrays associated with radiating elements are organized according to a second embodiment.

FIG. 5 illustrates an arrangement of a plurality of first sub-arrays $Sr_1$ and of a plurality of second sub-arrays $Sr_2$, the first sub-arrays $Sr_1$ (bounded by dots in the figure) and the second sub-arrays $Sr_2$ (bounded by dashes in the figure) being square in shape, each sub-array comprising 16 radiating elements. The second sub-arrays $Sr_2$ are thus offset with respect to the first sub-arrays $Sr_1$ in the direction X and in the direction Y by the same offset corresponding to half the side length of the square shape.

Figure 6:
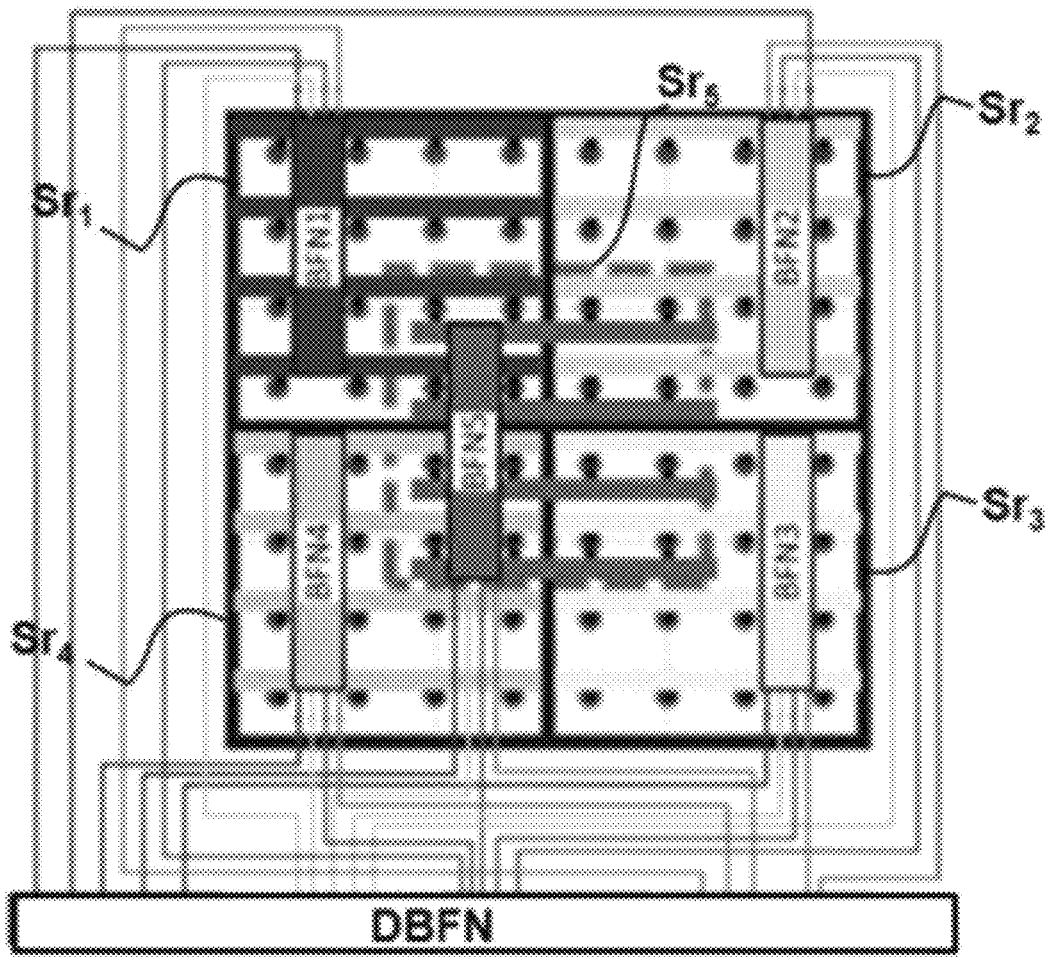
FIG. 6 illustrates a connection of five sub-arrays organized according to the second embodiment of FIG. 5.

FIG. 6 illustrates five sub-arrays $Sr_1$-$Sr_5$, including one belonging to the second group of sub-arrays. The first sub-array $Sr_1$, the second sub-array $Sr_2$, the third sub-array $Sr_3$, and the fourth sub-array $Sr_4$ are positioned beside one another. The fifth sub-array $Sr_5$ is superposed on the four other sub-arrays $Sr_1$-$Sr_4$ and shares radiating elements with these other sub-arrays. Thus, the fifth sub-array $Sr_5$ shares four radiating elements with the first sub-array $Sr_1$, four radiating elements with the second sub-array $Sr_2$, four radiating elements with the third sub-array $Sr_3$ and four radiating elements with the fourth sub-array Sra. The sub-arrays $Sr_1$-$Sr_5$ are thus said to be interleaved.

Inside each sub-array $Sr_1$, $Sr_2$, the various ports of the radiating elements are connected by one of the analogue beam-forming networks $ABFN_1$-$ABFN_M$. Each beam-forming network is made up of slabs joined to a common feedline. The network ABFN$_1$ associated with the first sub-array Sr$_1$ is illustrated in detail in FIG. 7. The radiating elements of the centre are connected to two different ABFNs.

Figure 7:
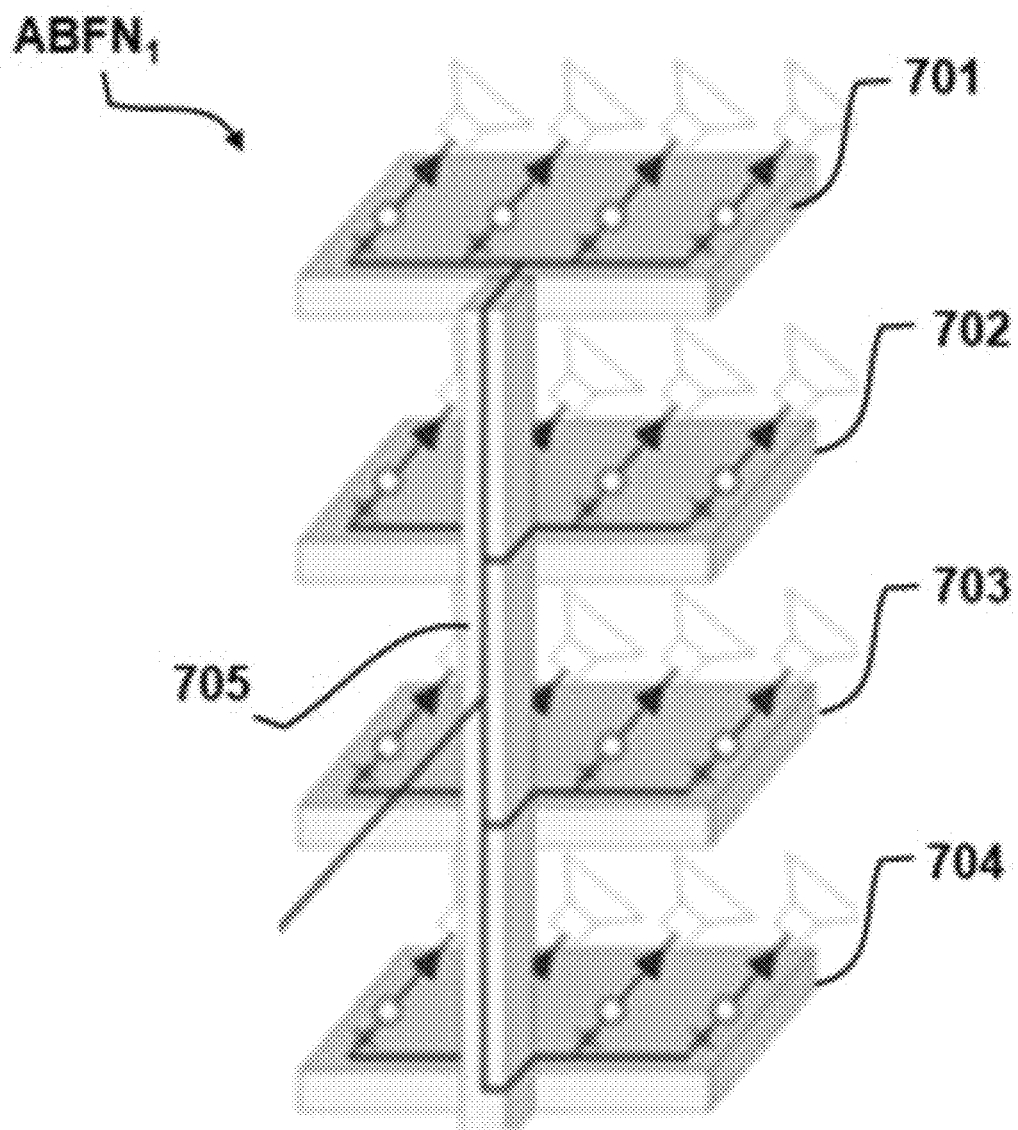
FIG. 7 illustrates a switch for the connection of a sub-array of FIG. 6.

FIG. 7 shows the implementation of the analogue beam-forming network ABFN$_1$, the latter being made up of slabs 701-704 associated with a common feedline 705. For the sake of simplicity, the case of a single regional beam will be considered; however, this case may be adapted to accommodate a plurality of regional beams. On each slab 701-704, there is division at the radiating elements as many times as there are beams. For each beam, phase-shift and attenuation coefficients and a partial summation are applied. On the common feedline 705, a complementary summation is applied for the various beams. The RF phase-shifters and attenuators are placed in the slabs. The summation of the signals is carried out partially in each slab (for four radiating elements) and in the common feedline for the complement (and the 16 radiating elements of the sub-array). For the sake of legibility, the connections with the digital stage DBFN have not been shown in FIG. 7.

Figure 9:
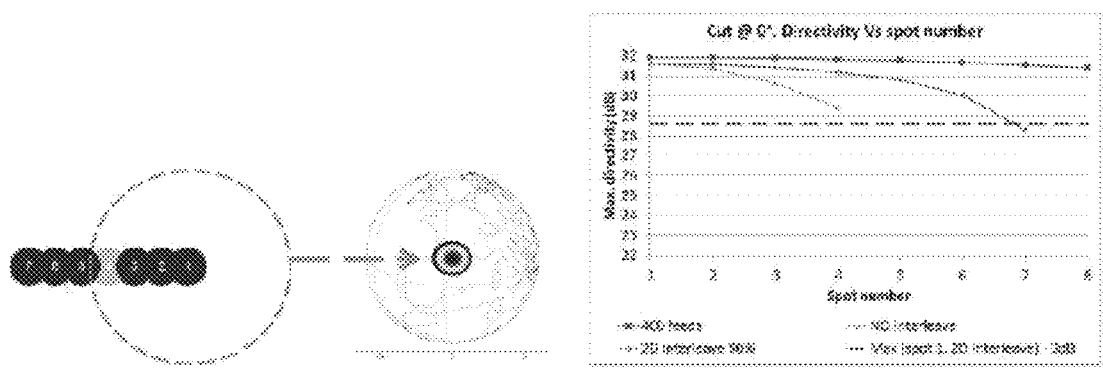
FIG. 9 illustrates directivity losses obtained with beam forming of a plurality of types for an antenna of 400 radiating elements.

The advantage of forming the interleaved hybrid beam is demonstrated for the case of an array antenna comprising 400 radiating elements of a size of 0.6λ, λ being the wavelength, for producing beams on earth from a satellite in a low-earth orbit (LEO). The reference antenna is divided into 25 sub-arrays of 16 radiating elements. A second grouping of 16 sub-arrays is identified, this one using the same radiating elements as the first sub-arrays, but offset by one half-period with respect to the first group of sub-arrays. The case of a regional beam pointed at the centre of the earth, and of directive beams pointed in various directions, inside then outside of this regional beam, is considered. Beam formation using the first grouping of sub-arrays (reference antenna) and using the two groupings of sub-arrays is compared. It turns out that when the directive beam is directed inside the regional beam, the directivity losses are much lower than those observed for the antenna consisting of the first group of sub-arrays alone. This reference antenna was characterized by −3 dB directivity losses obtained for a directive beam directed at the edge of the regional beam. They are due to the appearance of grating lobes. The same directivity losses are obtained in the case of interleaved hybrid formation for a directive beam pointing in an angular direction twice as large. FIG. 9 illustrates the directivity losses obtained with beam forming of a plurality of types for an antenna of 400 radiating elements: digital beam forming with the 400 radiating elements (line connecting the squares), hybrid beam forming with the 25 contiguous sub-arrays (line connecting the triangles), interleaved hybrid beam forming with the 25 contiguous sub-arrays and 16 superposed contiguous sub-arrays (line connecting the rhombi).

Figure 10:
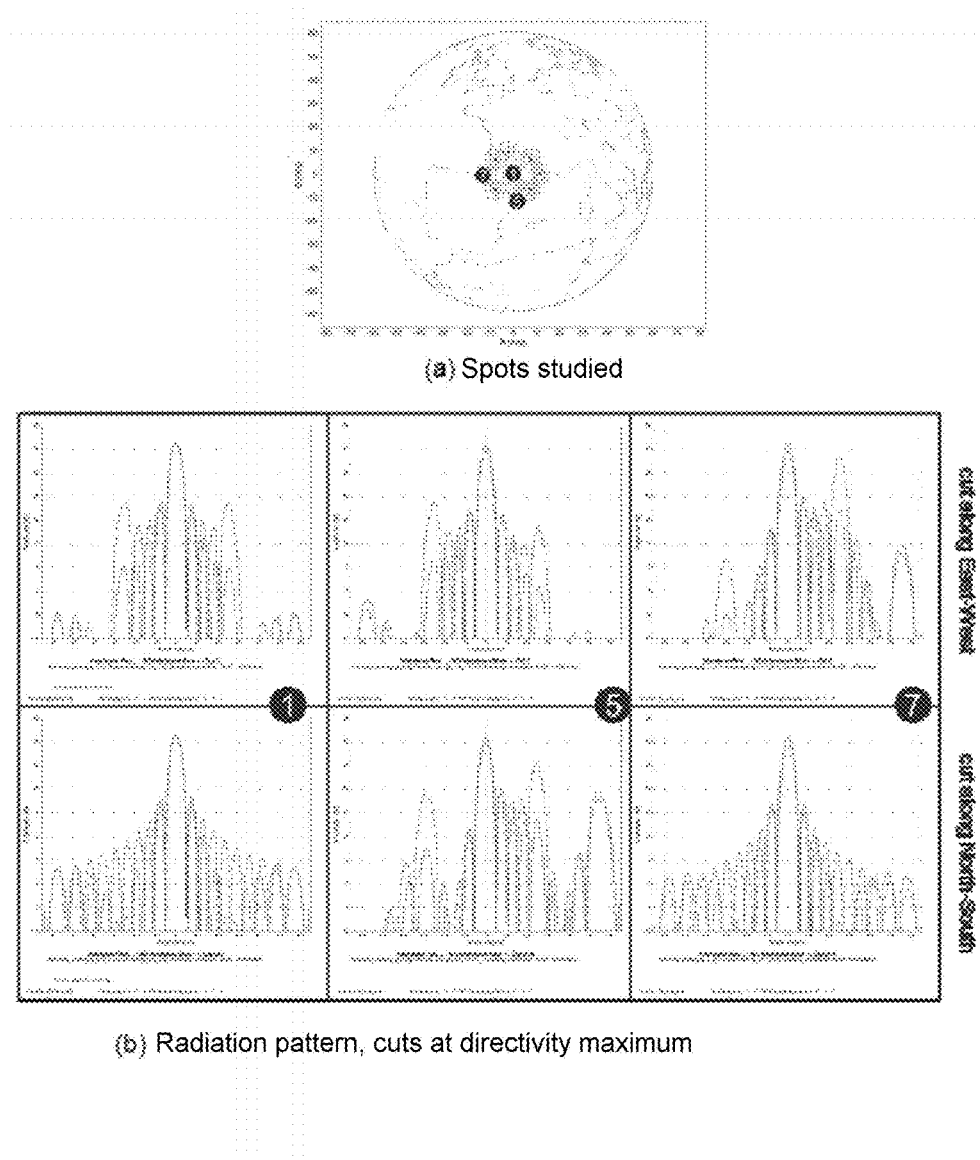
FIG. 10 illustrates radiation patterns for directive beams obtained by hybrid beam forming and hybrid beam forming with interleaving.

Interleaved beam forming is also advantageous from the point of view of the quality of the radiation pattern, as is illustrated in FIG. 10. Interleaved beam forming allows grating lobes to be suppressed. It also allows the level of sidelobes to be limited in comparison to the case without interleaving. With the reference antenna, 3 dB directivity losses are observed when the directive beam is directed at the edge of the regional beam, i.e. at a distance equal to three directive-beam widths from the central directive beam. With the antenna employing interleaved beam forming, the same losses are obtained for a distance equal to six directive-beam widths from the central directive beam.

As a result thereof, the angular sector addressable by a directive beam is two times larger than that obtained with the reference antenna. The number of directive beams that can be produced is therefore four times higher.

The number of digital-analogue conversion interfaces and of frequency-converting circuits required by the interleaved hybrid beam formation is increased merely by a factor of 41/25 (lower than 2).

Interleaved beam formation when the sub-arrays are superposed and offset by one half-period is thus very advantageous, because it allows the number of directive beams to be increased by a factor of 4, whereas the complexity of the digitization interfaces is increased only by a factor lower than 2.

This normalization by the number of digitization interfaces is advantageous because the number of directive beams that it is possible to produce inside a regional beam varies linearly with the number of sub-arrays contributing to the digital stage of the hybrid beam formation. Interleaved hybrid beam forming is therefore a more effective technique than increasing the size of the antenna array.

It should be noted that if the second group of sub-arrays is offset by one half-period only along one axis, the number of directive beams that it is possible to produce increases only in the interleaving direction. It is then equal to 2 to the first order, i.e. approximately to the factor of increase in complexity of the hybrid beam formation. The true advantage is achieved by offsetting the second group of sub-arrays by one half-period in both the two directions.

The number of directive beams may be further increased by suitably choosing the feed relationship/function of the sub-arrays. This especially also allows the sidelobes of the regional beams to be controlled, and thus any interference between signals belonging to two separate regional beams to be avoided.

Specifically, the theoretical basis of the invention is cancellation of the first grating lobe.

The array factor for an array antenna in which the radiating elements are fed with a uniform amplitude is written:

$$F(u) = \exp(j\pi(N-1)u] \frac{\sin\left(\frac{1}{2}Nk\right)du}{N\sin\left(\frac{1}{2}k\right)du} \quad (1)$$

where d is the size of a sub-array, k=2π/λ, u=sin(θ)−sin(θ$_0$), and N corresponds to the number of radiating elements.

A progression of the phase coefficient applied to two contiguous sub-arrays is equal to kd sin(θ$_0$). It allows the various sub-arrays to be coherent in the direction θ$_0$.

It is also well known that array antennas are governed by the grating-lobe equation, which describes the conditions of excitation of n grating lobes and their separation with respect to the pointing direction of the main beam:

$$\sin(\theta_{GL}) - \sin(\theta_0) = n\frac{\lambda}{d} \quad (2)$$

Thus, to allow the two groupings of sub-arrays offset by one half-period d/2 to be coherent in the direction θ$_0$, a phase of k(d/2) sin (θ$_0$) must be added to the phase relationship of the second grouping of sub-arrays.

By applying equation (2), this phase progression between the two groupings becomes:

$$k\frac{d}{2}\sin(\theta_{GL}) - n\pi \quad (3)$$

where $k(d/2) \sin (\theta_{GL})$ corresponds to the phase associated with the path difference of a wave incident in the direction $\theta_{GL}$ between two sub-arrays separated by d/2.

This means that, in the direction of the nth grating lobe, the contributions of the two groupings add with the weighting exp (jnπ). Grating lobes of uneven order generated by the two groupings cancel out, whereas grating lobes of even order sum.

Interleaving therefore allows the first grating lobe to be cancelled out, and therefore allows directivity $\theta_0$ to be increased by a factor of 2.

By interleaving in two directions, it is thus possible to produce four times more beams for an increase merely by a factor of 2 in the complexity of the beam formation.

Another theoretical basis of the invention is control of the second grating lobe. Specifically, having cancelled out the first grating lobe and more generally grating lobes of uneven order, it would be desirable to find conditions under which it would be possible to attenuate the second grating lobe, or more generally grating lobes of even order.

Specifically, the radiation pattern of each grouping of sub-arrays is expressed by the product of the array factor and of the radiation pattern of a sub-array. When the directive beam is directed at the border of the regional beam, the second grating lobe appears in the sidelobes of the radiation pattern of the sub-array.

By applying to the sub-array a window function that results in weak sidelobes, such as a tapered window function or a Taylor window function, it is possible to decrease the effect of this second grating lobe. This allows size of the angular sector in which directive beams can be formed to be further increased.

This second grating lobe will then become a hindrance at larger main-beam angles, at which this second grating lobe will coincide with the corresponding regional beam of the radiation pattern of the sub-array.

Figure 11:
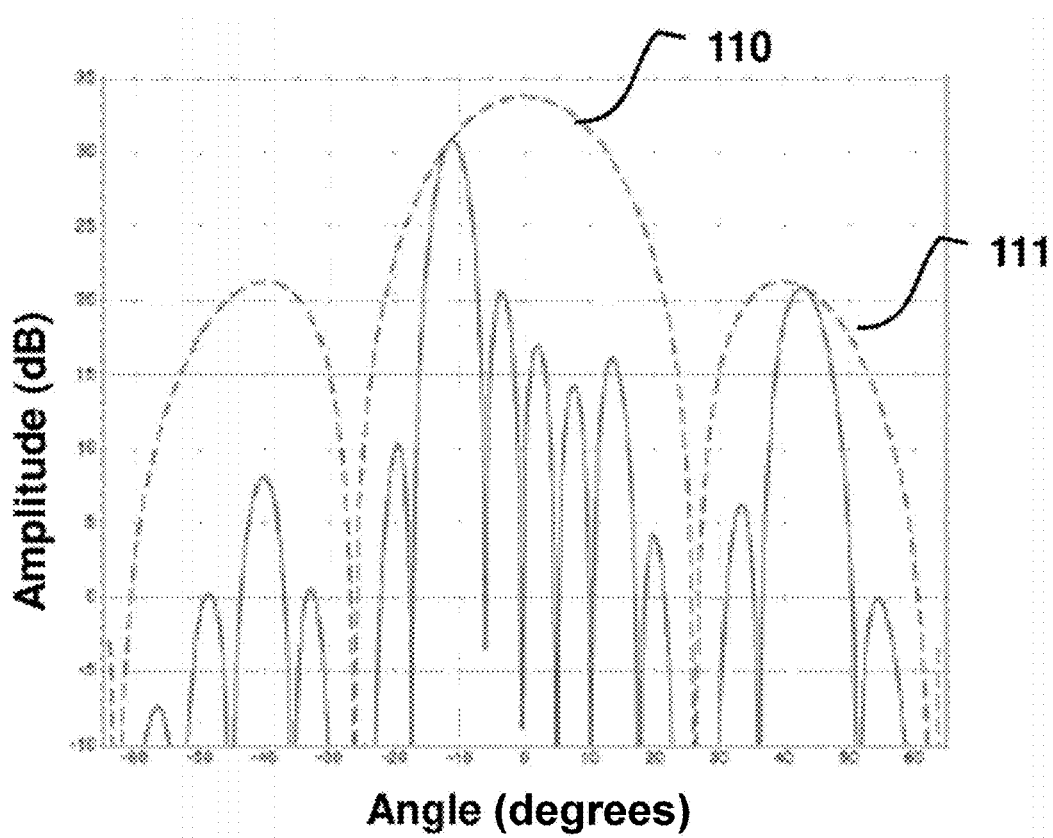
FIG. 11 illustrates application of a uniform window function to each sub-array.
Figure 12:
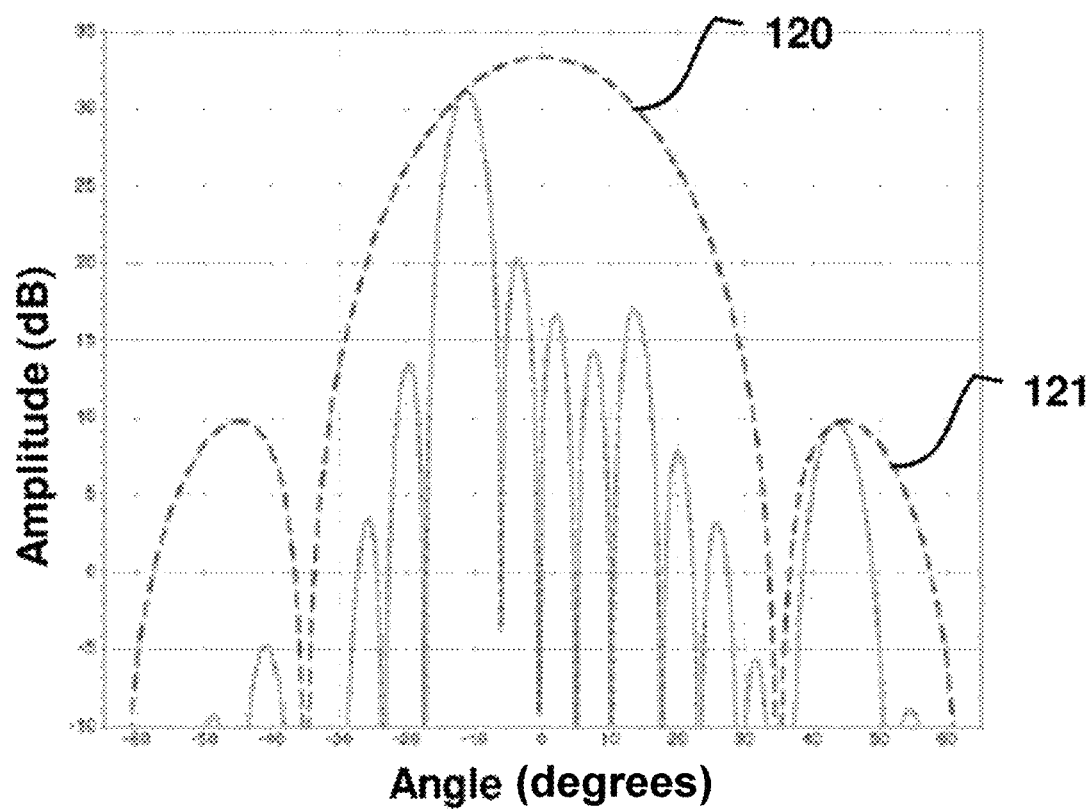
FIG. 12 illustrates application of a tapered window function to each sub-array.

To illustrate this point, FIG. 11 is a cut along East-West for a beam obtained using an antenna architecture employing interleaved sub-arrays (grouping of sub-arrays offset by one half-period) and of the radiation pattern of a sub-array, with a uniform sub-array window. The first grating lobe (110) was filtered using the aforementioned principle. The second grating lobe (111) and all the grating lobes of even order of the array factor correspond to directions corresponding to the sidelobes of the radiation patterns of the sub-arrays (also regional beams). These grating lobes are therefore attenuated by the attenuation of the spatial filtering carried out by the regional beam. It is for this reason that this regional beam has been superposed on the radiation pattern of the directive beams. FIG. 12 is a cut along East-West for a beam obtained using an antenna architecture employing interleaved sub-arrays (grouping of sub-arrays offset by one half-period) and of the radiation pattern of a sub-array, with a tapered sub-array window. The regional beam of a sub-array with a tapered feed window is characterized by lower sidelobes (121), and therefore by greater spatial filtering outside of the main lobe (120). Grating lobes that are even are therefore minimized.

This advantageous property may also be interpreted considering the equivalent phase and amplitude relationship resulting from the sum of the two phase-distribution relationships applicable to the two groupings of sub-arrays.

The case of a nadir-pointing regional beam, and of a directive beam oriented in a chosen direction inside this regional beam, the beam being oriented in its chosen direction through phase weighting in the digital stage of the hybrid beam-forming network, will be considered. The equivalent phase relationship obtained for the array indicates a stepwise progression for each of the two groupings of sub-arrays.

In the case of FIG. 11, a uniform window function was applied to each sub-array. The equivalent window function resulting from summation of the two feed window functions of the interleaved sub-arrays is then uniform, and the phase relationship indicates, in the radiating aperture, a stepwise progression the steps of which are in area four times smaller than for the phase relationship of a single grouping of sub-arrays.

In the case of FIG. 12, a tapered window function was applied to each sub-array. As the sub-arrays are offset by one half-period, the maximum amplitude obtained with the sub-arrays of the first grouping corresponds to the minimum amplitude obtained with the sub-arrays of the second grouping. The amplitude resulting from the summation is then approximately constant. The phase relationship resulting from the summation of the two feed relationships of the interleaved sub-arrays now indicates a more continuous progression, closer to the ideal continuous phase progression that would be required to orient the directive beam in the desired direction. This results in a smaller phase error between the achieved equivalent relationship and the ideal relationship, resulting in a lesser excitation of the second grating lobe.

Interleaved hybrid formation may be illustrated for two different multiple-access solutions: time-division multiple access and frequency-division multiple access.

Figure 13:
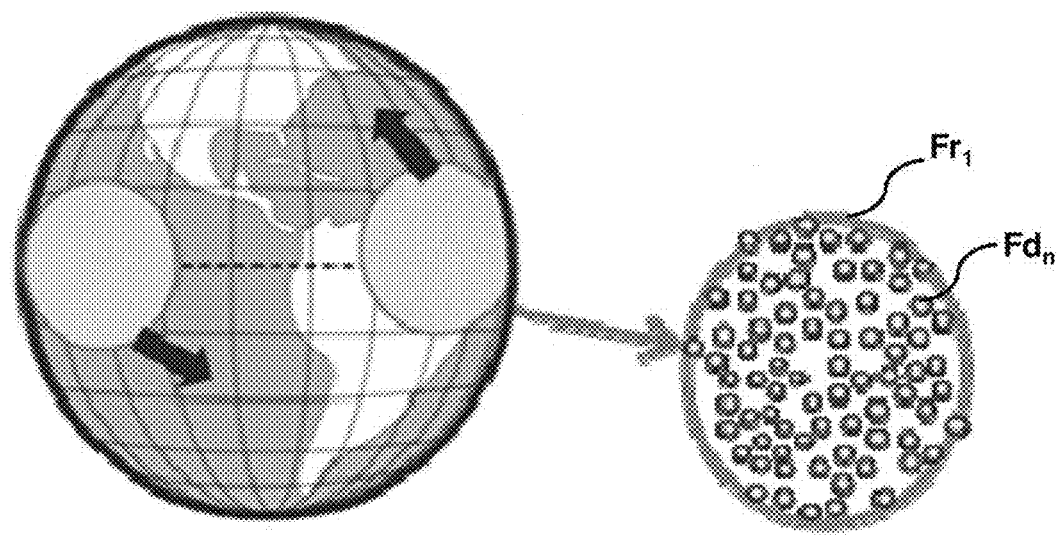
FIG. 13 illustrates application of hybrid beam forming to a time-division multiple-access solution.
Figure 14:
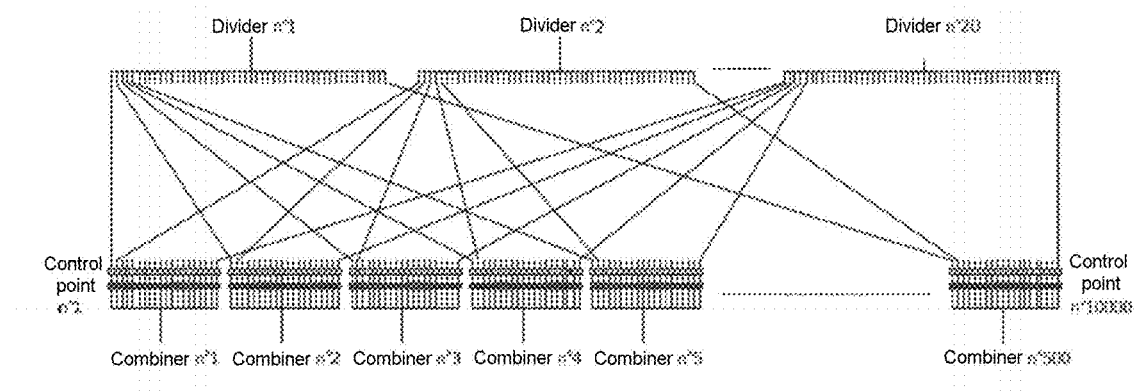
FIG. 14 illustrates reconfigurable analogue beam forming according to the prior art.

In the case of time-division multiple access (TDMA), it is possible to sequentially assign a given regional access beam to various directions, as is illustrated in FIG. 13. The analogue beam-forming network is then reconfigurable in each time interval. It may be a question of a beam-forming network such as illustrated in FIG. 14. In this figure, the analogue beam-forming network operates on radio-frequency signals. It performs dividing, phase-shifting, attenuating and combining operations. It is difficult to implement when the number of radiating elements and of beams is high. Thus, by way of example, to generate 20 beams with 500 radiating element, twenty 1 to 500 dividers, 10 000 amplitude/phase control points and five hundred 20 to 1 combiners have to be implemented in the analogue beam-forming network. It will be noted that each amplitude/phase control point incorporates variable delay lines or phase-shifters and may also incorporate variable amplifiers or attenuators. Physical implementation of these elements is beset not only by their high number, but also by how complex it is to route the signals between these various elements and how difficult it is to control the phase dispersions of this multitude of radio-frequency paths. This becomes truer the higher the operating frequency gets.

Figure 15:
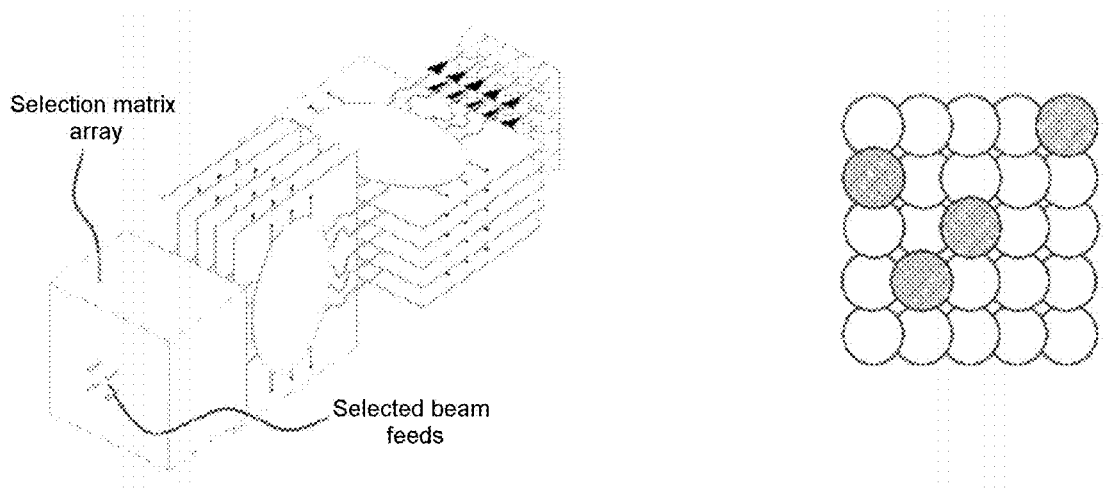
FIG. 15 illustrates a reconfigurable analogue beam-forming network with selection of beams from a preformed two-dimensional grid according to the prior art.

As a variant, it may be a question of a reconfigurable analogue beam-forming network with beam selection from a preformed two-dimensional grid. Such a beam-forming network is illustrated in FIG. 15. This reconfigurable beam-forming network is obtained by coupling a selection matrix array to a quasi-optical beam-forming network, such as one made up of Rotman lenses or continuous-delay lenses, in order to simultaneously produce a plurality of beams using a linear array of radiating elements.

Figure 16:
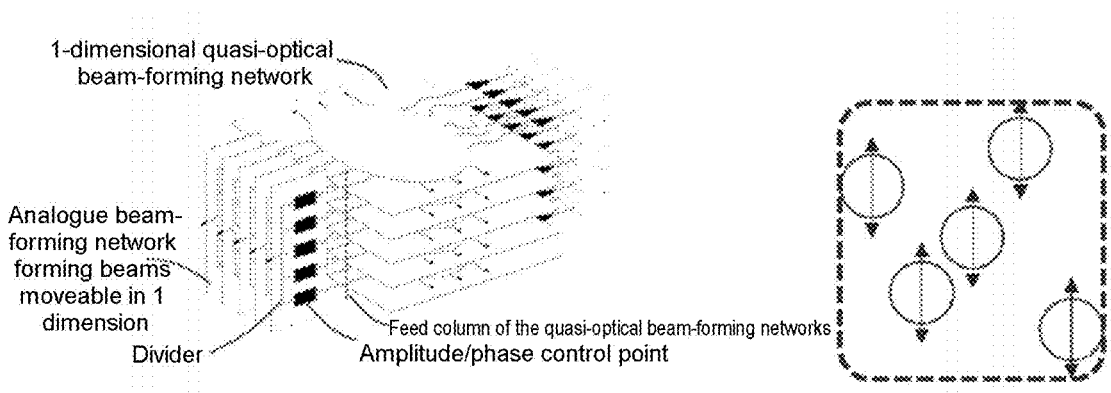
FIG. 16 illustrates an analogue beam-forming network associating quasi-optical beam-forming networks and formation of reconfigurable analogue beams according to the prior art.

As a variant, it may be a question of a low-complexity analogue beam-forming network associating quasi-optical beam-forming networks and formation of reconfigurable analogue beams. Such a beam-forming network is illustrated in FIG. 16. In this beam-forming network, quasi-optical beam-forming networks and reconfigurable analogue beam-forming networks are coupled in order to produce a two-dimensional analogue beam-forming network. Such a beam-forming network forms multiple beams reconfigurable along an axis.

TDMA is particularly advantageous from a hardware point of view, because it allows the number of antenna beam feeds to be decreased. It also results in decreases in power consumption related to digitization.

This technique allows the regional beams to be directed to adapt to the spatial distribution of traffic. Direction is adjusted to cover, in each time interval, an identical amount of traffic.

In the case of hybrid beam forming without interleaving, as shown in FIG. 1, care must be taken to avoid forming, in the same time interval, adjacent regional beams, in order to preclude the emergence of parasitic grating lobes and therefore interference resulting from the assignment of the same time resource to a user located in the parasitic lobe of the directive beam formed in the direction of the main user. In the case of interleaved hybrid beam forming, interference with grating lobes is no longer a threat.

By virtue of the interleaved hybrid beam formation, it becomes possible to increase the number of directive beams per regional beam by a factor of 4, while increasing the power consumed by digitization only by a factor of 2. It is also possible to produce adjacent regional beams, and to thus increase the number of beams sharing the same time resource that it is possible to produce with an array antenna.

Figure 17:
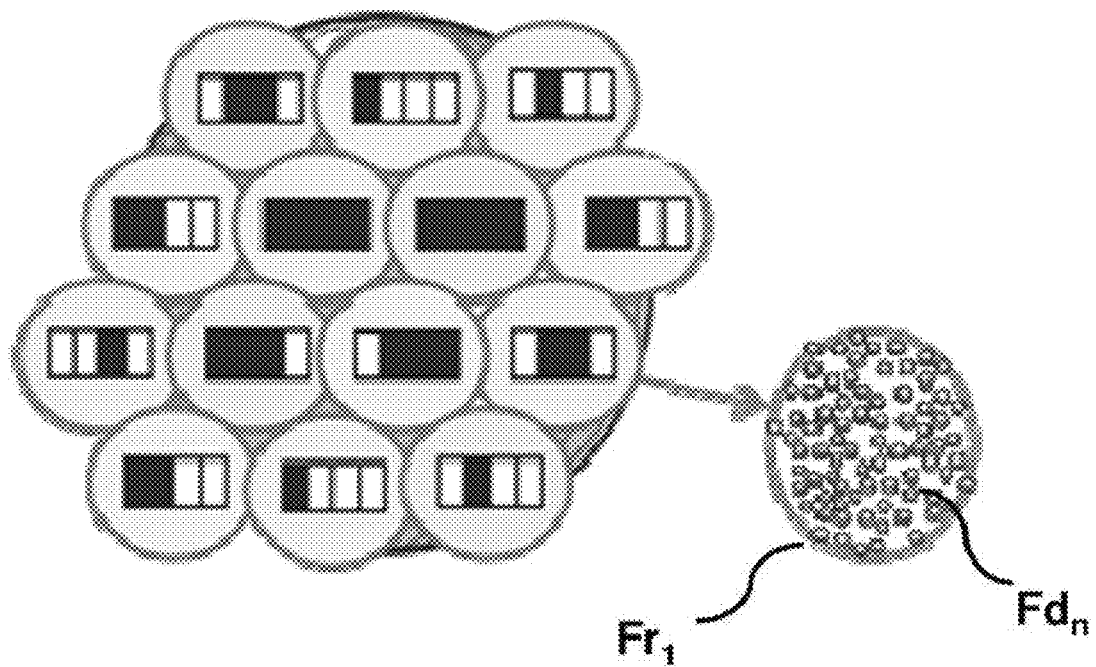
FIG. 17 illustrates application of hybrid beam forming to a frequency-division multiple-access solution.

In the case of frequency-division multiple access (FDMA), it is necessary to cover the geographic zone of interest with a grid of regional beams, as is illustrated in FIG. 17. Each sub-array must then be associated with a fixed or reconfigurable analogue beam-forming network, generating this multi-beam coverage.

This constraint limits the number of regional beams that it is possible to produce.

Figure 18:
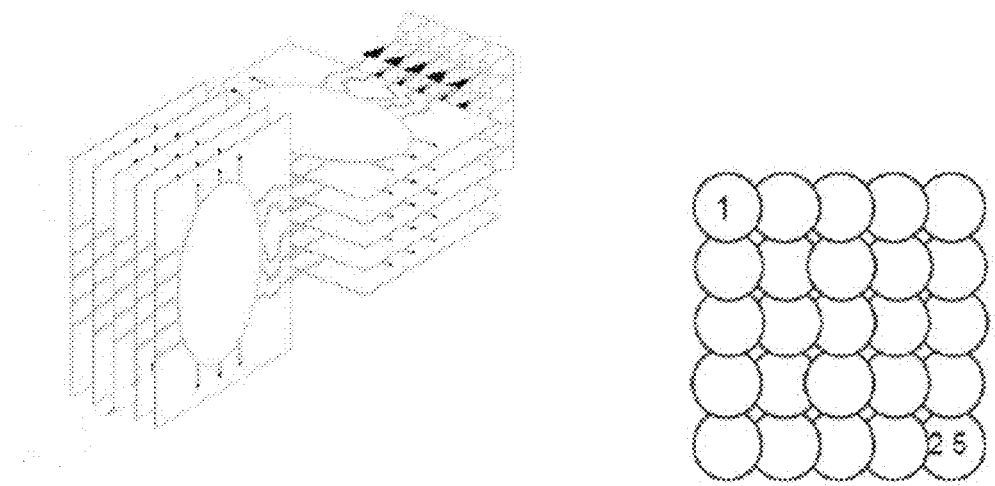
FIG. 18 illustrates a two-dimensional quasi-optical beam-forming network according to the prior art.

A two-dimensional quasi-optical beam-forming network, such as illustrated in FIG. 18, is one advantageous solution of lower complexity in the case of a fixed beam-forming network.

It is then possible to assign frequency sub-bands to the regional beam feeds. The width of these frequency bands depends on the amount of traffic in the zone covered by each regional beam. The higher the required amount of traffic, the more the allocated frequency bands are increased. This hybrid formation associated with this channelling also allows power consumption related to digitization to be decreased for each beam feed by a ratio that is proportional to the relative bandwidth (sub-band bandwidth/total bandwidth) assigned to the beam.

In the case of simple hybrid beam forming, as shown in FIG. 1, care must be taken to avoid assigning the same frequency bands to adjacent regional beams, in order to preclude the emergence of parasitic grating lobes discussed below and therefore interference resulting from the assignment of the same frequency resource to a user located in the parasitic lobe of the directive beam formed in the direction of the main user. In the case of interleaved hybrid beam forming, interference with grating lobes is no longer a threat.

By virtue of the interleaved hybrid beam formation, it becomes possible to increase the number of directive beams per regional beam by a factor of 4, while increasing the power consumed by digitization only by a factor of 2. It also becomes possible to allocate the same frequency bands to two adjacent regional beams, thus increasing the degree of frequency reuse, and therefore the throughput associated with an array antenna.

The invention claimed is:

1. An active-array multi-beam antenna suitable for receiving communication signals ($S_A$), said active-array multi-beam antenna comprising:

radiating elements ($RE_1$-$RE_N$), each radiating element being able to deliver output signals ($S_1$-$S_N$) based on communication signals ($S_A$), said radiating elements ($RE_1$-$RE_N$) being arranged in a matrix array (M) of radiating elements ($RE_1$-$RE_N$), said matrix array extending in a first direction (X) and in a second direction (Y) perpendicular to the first direction (X);

a hybrid device for forming directive beams ($Fd_1$-$Fd_p$), said hybrid device (20) comprising:

an analogue stage divided into a plurality of analogue beam-forming networks ($ABFN_1$-$ABFN_M$), each analogue beam-forming network ($ABFN_1$-$ABFN_M$) being associated with a sub-array ($Sr_1$-$Sr_N$) containing a plurality of radiating elements ($RE_1$-$RE_N$) of the matrix array (M), with a view to forming regional beams ($Fr_1$, $Fr_2$, $Fr_3$) from the output signals ($S_1$-$S_N$) delivered by said radiating elements ($RE_1$-$RE_N$), the sub-arrays ($Sr_1$-$Sr_N$) forming like regional beams ($Fr_1$, $Fr_2$, $Fr_3$),s a digital stage (DBFN) suitable for forming the directive beams ($Fd_1$-$Fd_p$) from the regional beams ($Fr_1$, $Fr_2$, $Fr_3$), said formed directive beams ($Fd_1$-$Fd_p$) being contained inside the regional beams (c );

a first sub-array ($Sr_1$) is associated with first radiating elements ($RE_1$-$RE_{24}$) of the matrix array (M), said first sub-array ($Sr_1$) having a rectangular shape having a first period ($d_1$) in the first direction (X) of the matrix array (M) and a second period ($d_2$) in the second direction (Y) of the matrix array (M), and a second sub-array ($Sr_2$) is associated with second radiating elements ($RE_{16}$-$RE_{18}$, $RE_{22}$-$RE_{42}$) of the matrix array (M), the second sub-array ($Sr_2$) having the same periods ($d_1$, $d_2$) as the first sub-array ($Sr_1$), the second sub-array ($Sr_2$) partially overlapping the first sub-array ($Sr_1$) so that some radiating elements ($RE_{16}$, $RE_{17}$, $RE_{18}$, $RE_{22}$, $RE_{23}$, $RE_{24}$) are common to said first sub-array ($Sr_1$) and to said second sub-array ($Sr_2$), said multi-beam antenna being wherein the second sub-array ($Sr_2$) is offset with respect to the first sub-array ($Sr_1$) in the first direction (X) of the matrix array by a first offset corresponding to half the first period ($d_1$) of the rectangular shape of the first sub-array ($Sr_1$) and the second sub-array ($Sr_2$) is offset with respect to the first sub-array ($Sr_1$) in the second direction (Y) of the matrix array (M) by a second offset corresponding to half the second period ($d_2$) of the rectangular shape, the first sub-array belonging to a first group ($Gr_1$) of sub-arrays and the second sub-array belonging to a second group ($Gr_2$) of sub-arrays, said second group ($Gr_2$) of sub-arrays being offset with respect to said first group ($Gr_1$) of sub-arrays by said first offset and by said second offset.

2. The active-array multi-beam antenna according to claim 1, wherein the first period ($d_1$) and the second period ($d_2$) of the first sub-array ($Sr_1$) are identical so that the first sub-array ($Sr_1$) and the second sub-array ($Sr_2$) have a square shape.

3. The active-array multi-beam antenna according to claim 1, wherein the directive beams have various widths.

4. The active-array multi-beam antenna according to claim 1, wherein the analogue stage forms at least two regional beams with different widths.

5. The active-array multi-beam antenna according to claim 1, wherein the communication signals ($S_A$) are subjected to a uniform window function or to a tapered window function.

6. The active-array multi-beam antenna according to claim 1, wherein the analogue stage comprises a quasi-optical beam-forming network.

7. The active-array multi-beam antenna according to claim 6, wherein the quasi-optical beam-forming network comprises Rotman lenses or continuous-delay lenses.

8. The active-array multi-beam antenna according to claim 1, wherein said antenna is reconfigurable.

9. The active-array multi-beam antenna according to claim 8, wherein the analogue stage comprises a time-division multiple-access module suitable for forming at least one reconfigured regional beam, said reconfigured regional beam moving at the rate of a time frame.

10. The active-array multi-beam antenna according to claim 1, wherein the analogue stage comprises a frequency-division multiple-access module suitable for forming a plurality of contiguous regional beams associated with sub-bands of variable width.

11. A communication satellite comprising an active-array multi-beam antenna according to claim 1.

* * * * *

UNITED STATES PATENT AND TRADEMARK OFFICE
CERTIFICATE OF CORRECTION

| | | |
|---|---|---|
| PATENT NO. | : 12,381,320 B2 | Page 1 of 1 |
| APPLICATION NO. | : 17/990248 | |
| DATED | : August 5, 2025 | |
| INVENTOR(S) | : Hervé Legay et al. | |

It is certified that error appears in the above-identified patent and that said Letters Patent is hereby corrected as shown below:

In the Claims

In Claim 1, Column 12, Line 36, "inside the regional beams (c);" should be -- inside the regional beams (Fr1, Fr2, Fr3); --.

Signed and Sealed this
Fourteenth Day of October, 2025

John A. Squires
*Director of the United States Patent and Trademark Office*